US012803892B2

(12) United States Patent
Huang

(10) Patent No.: US 12,803,892 B2
(45) Date of Patent: Nov. 17, 2026

(54) COMMUNICATION METHOD AND COMMUNICATION DEVICE

(71) Applicant: QUECTEL WIRELESS SOLUTIONS CO., LTD., Shanghai (CN)

(72) Inventor: Qufang Huang, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 19/443,614

(22) Filed: Jan. 8, 2026

(65) Prior Publication Data

US 2026/0135789 A1 May 14, 2026

Related U.S. Application Data

(63) Continuation of application No. PCT/CN2024/100799, filed on Jun. 21, 2024.

(51) Int. Cl.
*H04L 43/0894* (2022.01)
*H04L 43/062* (2022.01)

(52) U.S. Cl.
CPC ........ *H04L 43/0894* (2013.01); *H04L 43/062* (2013.01)

(58) Field of Classification Search
None
See application file for complete search history.

(56) References Cited

U.S. PATENT DOCUMENTS

| | | | | |
|---|---|---|---|---|
| 2020/0077299 A1* | 3/2020 | Wu | ........................ | H04L 1/1642 |
| 2025/0158752 A1* | 5/2025 | Kanamarlapudi | .... | H04L 1/1896 |
| 2025/0379705 A1* | 12/2025 | Fan | ........................ | H04L 1/1685 |
| 2026/0046691 A1* | 2/2026 | Sun | ........................ | H04W 8/22 |

FOREIGN PATENT DOCUMENTS

CN 110943808 A 3/2020

OTHER PUBLICATIONS

International Search Report in International Appln. No. PCT/CN2024/100799, mailed on Mar. 12, 2025, 5 pages (with English translation).

* cited by examiner

*Primary Examiner* — June Sison
(74) *Attorney, Agent, or Firm* — Fish & Richardson P.C.

(57) ABSTRACT

A communication method and a communication device are provided. One example method includes: in response to meeting a first condition, regarding, by a first device, an unreceived first data packet as received, wherein the first condition is determined based on a second data packet received by the first device, and the first data packet and the second data packet are data packets transmitted in a radio link control (RLC) acknowledged mode.

20 Claims, 5 Drawing Sheets

200

COMMUNICATION METHOD AND COMMUNICATION DEVICE

CROSS-REFERENCE TO RELATED APPLICATIONS

This application is a continuation of International Application No. PCT/CN2024/100799, filed on Jun. 21, 2024, the disclosure of which is hereby incorporated by reference in its entirety.

TECHNICAL FIELD

The present disclosure relates to the technical field of communication, and in particular to a communication method and a communication device.

BACKGROUND

A radio link control (RLC) layer includes three operation modes: transparent mode (TM), unacknowledged mode (UM), and acknowledged mode (AM). In the AM, when a receiver fails to receive data packets transmitted by the transmitter, it can instruct a transmitter to retransmit the data packets through an RLC status report. However, the current retransmission mechanism has relatively high data packet transmission delays. Especially for certain data services with requirements for high reliability and low delay, the existing AM cannot meet their needs.

SUMMARY

A communication method and a communication device are provided according to the present disclosure. Various aspects involved in the embodiments of the present disclosure are described below.

In a first aspect, a communication method is provided. The communication method includes: in response to meeting a first condition, regarding, by a first device, an unreceived first data packet as received. The first condition is determined based on a second data packet received by the first device, and the first data packet and the second data packet are data packets transmitted in a radio link control (RLC) acknowledged mode.

In a second method, a communication method is provided. The communication method includes: transmitting, by a second device, first information to a first device. The first information is configured to determine whether an unreceived first data packet is regarded as received, the first information is associated with a second data packet received by the first device, and the first data packet and the second data packet are data packets transmitted in a radio link control (RLC) acknowledged mode.

In a third aspect, a communication device is provided. The communication device includes: a processing unit, configured to determine according to first information, whether to regard an unreceived first data packet as received. The first information is associated with a second data packet received by the first device, and the first data packet and the second data packet are data packets transmitted in a radio link control (RLC) acknowledged mode.

In a fourth aspect, a communication device is provided. The communication device includes a transmitting unit, configured to transmit first information to a first device. The first information is configured to determine whether an unreceived first data packet is regarded as received, the first information is associated with a second data packet received by the first device, and the first data packet and the second data packet are data packets transmitted in a radio link control (RLC) acknowledged mode.

In a fifth aspect, a communication is provided. The communication device includes a processor, a memory and a transceiver. The memory is configured to store at least one computer program, and the processor is configured to call the at least one computer program from the memory, so that the communication device executes a portion or all of the steps in the method according to the first aspect.

In a sixth aspect, a communication device is provided. The communication device includes a processor, a memory and a transceiver. The memory is configured to store at least at least one computer program, and the processor is configured to call the at least one computer program from the memory, so that the communication device executes a portion or all of the steps in the method according to the second aspect.

In a seventh aspect, a communication system is provided according to some embodiments of the present disclosure, which includes the above communication device including the first device and the second device. In some implementations, the communication system further includes other devices that interact with the communication device.

In an eighth aspect, a computer-readable storage medium is provided according to some embodiments of the present disclosure. A computer program is stored on the computer-readable storage medium, to cause a communication device such as a first device or a second device to execute a portion or all of the steps in the method according to any one of the above aspects.

In a ninth aspect, a computer program product is provided according to some embodiments of the present disclosure. The computer program product includes a non-transitory computer-readable storage medium storing a computer program operable to cause a communication device, such as a first device and a second device, to execute a portion or all of the steps in the methods according to any one of the above aspects. In some implementations, the computer program product is a software installation package.

In a tenth aspect, a chip is provided according to some embodiments of the present disclosure. The chip includes a memory and a processor, and the processor is configured to call a computer program from the memory to execute a portion or all of the steps in the method according to any one of the above aspects.

In the embodiments of the present disclosure, the first device determines whether to regard the unreceived data packet as received, so as to avoid unnecessary retransmission by regarding the unreceived data packet as received, thereby being beneficial to reducing delay and saving transmission resources.

DETAILED DESCRIPTION OF THE EMBODIMENTS

The technical solutions in the present disclosure will be described below in conjunction with the accompanying drawings. In order to facilitate understanding, communication terms and communication processes possibly involved in the embodiments of the present disclosure are described in conjunction with FIG. 1 to FIG. 4.

Communication System

The technical solutions according to the embodiments of the present disclosure can be applied to various communication systems. For example, the embodiments of the present disclosure can be applied to a 5th-generation (5G) system, a new radio (NR) system, a long term evolution (LTE) system, an LTE frequency division duplex (FDD) system, and a LTE time division duplex (TDD) system. The technical solution according to the embodiments of the present disclosure can be applied to a future communication system, for example, a 6th-generation (6G) mobile communication system, or a satellite communication system.

Figure 1:
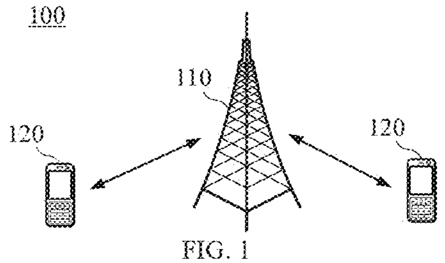
FIG. 1 is a schematic diagram of a wireless communication system applied to embodiments of the present disclosure.

FIG. 1 is a wireless communication system 100 applied to embodiments of the present disclosure. The wireless communication system 100 includes a network device 110 and a terminal device 120. The network device 110 can provide communication coverage for a specific geographical area and can communicate with terminal devices 120 located in the coverage area.

FIG. 1 exemplarily shows one network device and two terminal devices. In some embodiments of the present disclosure, the communication system 100 may include multiple network devices, and the coverage area of each network device may include terminal devices with other number. In addition, the wireless communication system 100 may further include other network entities such as a network controller and a mobility management entity.

The terminal device mentioned in the embodiments of the present disclosure can also be referred to as user equipment (UE), access terminal, user unit, user station, mobile station (MS), mobile terminal (MT), remote station, remote terminal, mobile device, user terminal, terminal device, wireless communication device, user agent or user device, etc. In some embodiments, the terminal device may be a device that provides voice and/or data connectivity to a user, and may be configured to connect people, things and machines, such as household appliances with wireless connection function, sensors, electronic tags, etc. The terminal device can be a wireless terminal in a smart home, a wireless terminal in an IWSN, a wireless terminal in smart logistics and smart warehousing, a wireless terminal in self-driving, a wireless terminal in remote medical surgery, a wireless terminal in smart grid, a wireless terminal in transportation safety, and a wireless terminal in smart city, etc.

The network device in the embodiments of the present disclosure is a device for communicating with the terminal device, which be referred to as an access network device or a radio access network device. For example, the network device can be a base station. The network device in the embodiments of the present disclosure can refer to a radio access network (RAN) node (or device) that connects the terminal device to the wireless network. The base station can broadly cover various names as follows, or can be replaced with the following names, such as: NodeB, evolved NodeB (eNB), next generation NodeB (gNB), relay station, access point, transmitting and receiving point (TRP), transmitting point (TP), master evolved NodeB (MeNB), secondary evolved NodeB (SeNB), multi-standard radio (MSR) node, home base station, network controller, access node, wireless node, access point (AP), transmission node, transceiver node, base band unit (BBU), remote radio unit (RRU), active antenna unit (AAU), remote radio head (RRH), centralized unit (CU), distributed unit (DU), positioning node, etc. The base station can be a macro base station, a micro base station, a relay node, a donor node, or the like, or a combination thereof. The base station can also refer to a communication module, a modem, or a chip installed in the aforementioned device or equipment. The base station can also be a mobile switching center, a device that undertakes the functions of a base station in device-to-device (D2D), vehicle-to-everything (V2X), machine-to-machine (M2M) communications, a network-side device in a 6G network, and a device that undertakes the functions of a base station in a future communication system, etc. The base station can support networks with the same or different access technologies. The embodiments of the present disclosure do not limit the specific technology and specific device form adopted by the network device.

The base station can be fixed or mobile. For example, a helicopter or a drone can be configured as a mobile base station, and one or more cells can move according to the position of the mobile base station. In other examples, a helicopter or a drone can be configured as a device to communicate with another base station.

In some examples, the network device according to the embodiments of the present disclosure can be CU or DU, or the network device can include both CU and DU. Alternatively, gNB can further include AAU.

The network device and the terminal device can be deployed on land, including indoors or outdoors. The network device and the terminal device can be deployed on the water surface. The network device and the terminal device can be deployed on an aircraft, a balloon, or a satellite in the air. The scenarios where the network devices and terminal devices are located are not limited by the embodiments of the present disclosure.

Operation Modes of RLC Layer

Figure 2:
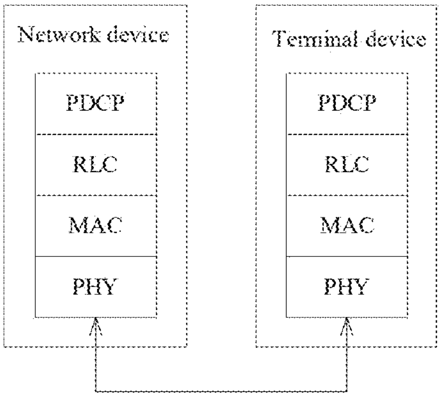
FIG. 2 is a schematic diagram of a protocol layer according to an embodiment of the present disclosure.

In order to achieve data transmission over an air interface in wireless cellular networks, corresponding protocol layers are respectively configured in network devices and terminal devices to accomplish different functions. For example, as shown in FIG. 2, the network devices and the terminal devices may include protocol layers such as packet data convergence protocol (PDCP) layer, RLC layer, media access control (MAC) layer, physical layer (PHY), etc. The PDCP layer is responsible for security, integrity protection, and sequential transmission. The RLC layer is responsible for data forwarding, segmentation, retransmission, discard, and RLC re-establishment. The MAC layer is responsible for allocating transmission opportunities to each data ratio bearer (DRB) and organizing transmission blocks for transmission. The PHY layer is responsible for transmitting data over the wireless interface.

The technical solutions according to the embodiments of the present disclosure mainly relate to the RLC layer. The RLC layer is located between the PDCP layer and the MAC layer, communicates with the PDCP layer through an RLC channel, and communicates with the MAC layer through a logical channel (LCH). The function of the RLC layer is realized by RLC entity, which is created when an RLC bearer is established and deleted when the RLC bearer is released. Each RLC entity can be configured by a radio resource control (RRC) layer, and includes three operation modes: transparent mode (TM), unacknowledged mode (UM), and acknowledged mode (AM), so as to meet different service requirements.

The transparent mode (TM), also known as transparent transmission mode, is mainly used for the transmission of information such as paging and broadcasting. For an RLC entity operating in TM, data remains transparent, and the RLC entity does not alter the data in any way. For example, it does not segment an RLC service data unit (SDU) and does not append any header information. A TM entity consists of a transmission buffer that stores RLC SDUs, which is configured to buffer the forwarded data. When the MAC layer notifies the TM entity of a transmission opportunity, the TM entity directly transmits the RLC SDU in the transmission buffer to the MAC layer without any modifications.

The unacknowledged mode (UM) provides an unreliable service and cannot guarantee 100% successful data transmission. For an RLC entity operating in UM, after receiving data from higher layers, it generates an unacknowledged mode data (UMD) protocol data unit (PDU) for each RLC service data unit (SDU). The UMD PDU includes header information and is cached in the transmission buffer. When the MAC layer notifies the RLC entity to transmit RLC PDUs, it segments RLC SDUs if necessary and regenerates the RLC header and the RLC PDUs, so as to ensure that a total size of the finally sent RLC PDUs is equal to a size indicated by the MAC layer. In the UM, the transmitter is only responsible for data transmission without verifying the success reception of the receiver, and the receiver does not transmit acknowledgment of correct reception to the transmitter. Therefore, the UM enables data to be delivered to the peer RLC entity in sequence with the lowest delay. The UM is mainly suitable for delay-sensitive services allowing packet loss, such as voice over new Radio (VoNR) in NR.

The acknowledged mode (AM) provides a reliable service, and is mainly suitable for services insensitive to delay but sensitive to errors, such as file transfer protocol (FTP) services. In order to ensure successful transmission of each data, the AM is configured with an automatic repeat request (ARQ) error correction function. After transmitting data, the transmitter needs to wait for the receiver to reply with an acknowledgment of whether the data was correctly received, and resend the data that the receiver failed to receive in case of a negative acknowledgment. Therefore, the AM can provide reliable data transmission for an upper layer, thereby ensuring that the data is correctly delivered to the peer in sequence. In the AM, if the data transmission is unsuccessful, multiple retransmissions can be performed. When the number of retransmissions reaches a maximum number of retransmissions, it is considered that the quality of a radio interface is too poor, and thus an RRC re-establishment is initiated. Therefore, the data transmission delay in the AM is relatively large.

Status Parameters in the AM

The fundamental design concept of the AM is to ensure the successful transmission of each data packet through retransmissions, which are triggered by an RLC status report transmitted by the receiver. The receiver maintains relevant status parameters, updates the status parameters continuously according to an RLC serial number (SN) carried in the header of the received data packets, and transmits the RLC status report to the transmitter when specific conditions are met, so as to prompt the retransmission of data packets. It should be noted that while the serial numbers of data transmitted by the transmitter gradually increases sequentially, the serial numbers of data packets received by the receiver may not increase monotonically due to hybrid automatic repeat-request acknowledgement (HARQ) of the MAC layer. Therefore, the receiver uses status parameters to trigger the RLC Status Reports.

Figure 3:
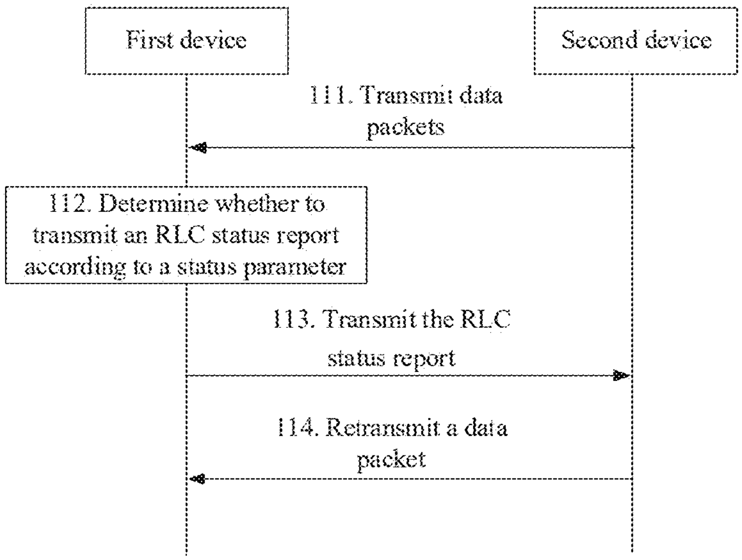
FIG. 3 is a schematic diagram of data packet retransmission in AM.

For example, FIG. 3 shows the schematic diagram of triggering retransmission in the AM. The first device is the receiver, and the second device is the transmitter. For example, the first device is the terminal device 120 shown in FIG. 1, and the second device is the network device 110 shown in FIG. 1. Alternatively, the second device is the network device 110 shown in FIG. 1, and the first device is the terminal device 120 shown in FIG. 1.

As shown FIG. 3, in step 111, transmitting, by the second device, data packets to the first device.

If the first device is the terminal device and the second device is the network device, the data packet is a downlink data packet. If the second device is the network device and the first device is the terminal device, the data packet is an uplink data packet.

In step 112, determining, by the first device, whether to transmit an RLC status report according to a current status parameter.

In this case, step 113 and step 114 are executed when the RLC status report is determined to be transmitted.

In step 113, transmitting, by the first device, the RLC status report to the second device.

In step 114, retransmitting, by the second device, a data packet based on the RLC status report.

In the AM, the receiver needs to maintain the following status parameters, where RX represents the receiver.

A first parameter (denoted as RX_Next) is configured to indicate a next serial number after a serial number of a last completely correctly received data packet, and can be used as a lower edge of a reception window. The reception window is represented as [RX_Next, RX_Next+AM_Window_Size], where AM_Window_Size represents a length of the reception window. For example, it can generally be selected as $2^{SN}/2$. It is assumed that the length of SN is 12 bits, the length of the reception window can be selected as the length of data packets with $2^{12}/2$.

A second parameter (denoted as RX_Highest_Status) is configured to indicate an updated serial number upon timeout of a reassembly timer, which corresponds to an ACK_SN when the RCL status report is triggered, or a maximum value that the ACK_SN can be set to in the RCL status report.

A third parameter (denoted as RX_Next_Highest) is configured to indicate a next serial number after a serial number of a received data packet with a maximum received serial number.

A fourth parameter (denoted as RX_Next_Status_Trigger) is configured to indicate a serial number of a next incorrectly received data packet after a serial number of a data packet triggering the reassembly timer.

In the RLC layer, the acknowledgement for display is not performed for each data packet, and the receiver generally transmits the RLC status report of multiple data packets, so as to reduce the overhead. For example, the conditions for triggering the RLC status report may include at least one of the following: the receiver receives polling information transmitted by the transmitter; the reassembly timer times out; and a t-Status Prohibit timer times out.

The reassembly timer is configured to detect packet loss in the underlying transmission. When a gap occurs within the reception window of the RLC entity of the receiver, that is, the serial numbers (SN) of received data packets are discontinuous, the reassembly timer is started. When the gap between the serial numbers indicated by RX_Next and RX_Next_status_trigger is filled, the reassembly timer is stopped and cleared. When the reassembly timer times out, the RLC entity of the receiver triggers an RLC status report and transmits the RLC status report to the RLC entity of the transmitter.

The status parameters maintained by the receiver are described in detail in conjunction with FIG. 4 to FIG. 7. Herein, it is assumed that a size of the reception window (AM_Window_Size) is 10.

In an initial state, RX_Next, RX_Highest_Status, RX_Next_Highest, and RX_Next_Status_Trigger are all set to 0.

Figure 4:
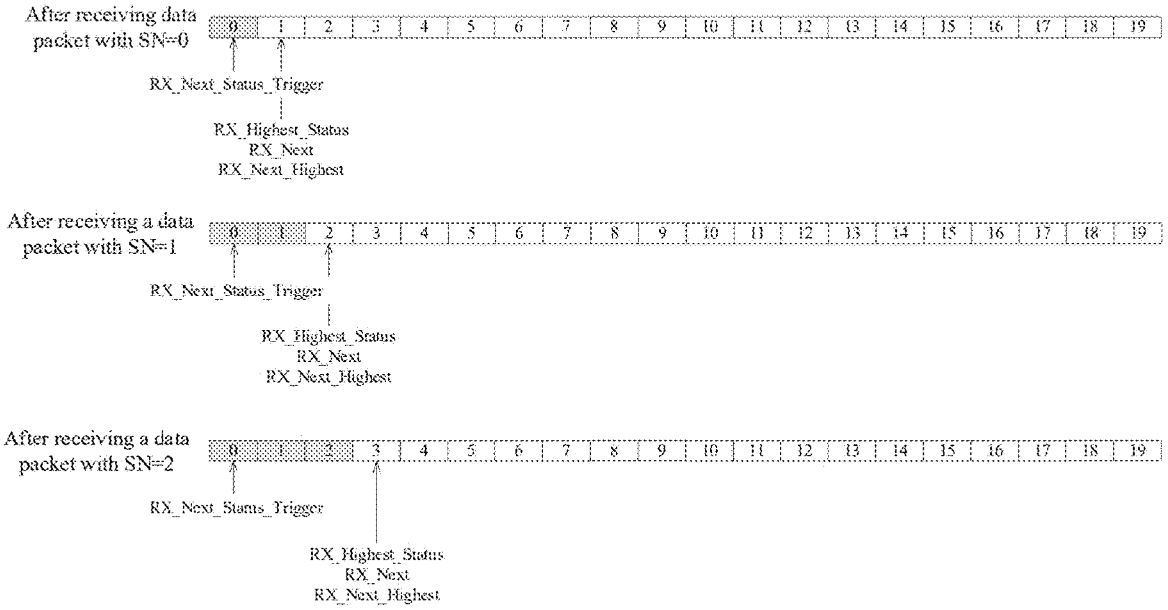
FIG. 4 to FIG. 7 are schematic diagrams of changes in status parameters of a receiver.

In the case of sequential reception, as shown in FIG. 4, RX_Next, RX_Highest_Status, and RX_Next_Highest are updated sequentially in sequence. RX_Next_Status_Trigger remains unchanged, and the reassembly timer is not started.

Specifically, as shown in FIG. 4, after the data packet with SN=0 is received, RX_Next_Status_Trigger remains at an initial value of SN=0, and RX_Next, RX_Highest_Status, and RX_Next_Highest are all updated to SN=1. After the data packet with SN=1 is received, RX_Next_Status_Trigger remains at the initial value of SN=0, RX_Next, RX_Highest_Status, and RX_Next_Highest are all updated to SN=2. After the data packet with SN=2 is received, RX_Next_Status_Trigger remains at the initial value of SN=0, and RX_Next, RX_Highest_Status, and RX_Next_Highest are all updated to SN=3. If an RLC status report is assembled at this time, ACK_SN=3 is filled in the RLC status report.

In a non-ideal scenario, as shown in FIG. 4, it is assumed that the receiver sequentially receives data packets with SN=0, SN=5, and SN=8, upon receiving the data packet with SN=5, since the transmitter transmits data packets in the order of increasing SN, the receiver can determine that the transmitter has already transmitted data packets with SN=1, SN=2, SN=3, and SN=4. The four data packets are temporarily unreceived due to HARQ retransmission, so the receiver starts the reassembly timer to wait for the four data packets.

Specifically, as shown in FIG. 4, after the data packet with SN=5 is received, RX_Highest_Status remains at SN=0, RX_Next is updated to SN=1, and RX_Next_Status_Trigger and RX_Next_Highest are updated to SN=6. After the data packet with SN=8 is received, RX_Highest_Status remains at SN=0, RX_Next is updated to SN=1, RX_Next_Status_Trigger remains at SN=6, and RX_Next_Highest is updated to SN=9. Herein, if the reassembly timer started earlier has not yet timed out when the data packet with SN=8 is received, the data packet triggering the reassembly timer remains the data packet with SN=5, so RX_Next_Status_Trigger stays at SN=6 after SN=5. However, if the reassembly timer has timed out before the data packet SN=8 is received, the reassembly timer is triggered again when the data packet with SN=8 is received. In this case, RX_Next_Status_Trigger is updated to SN=9.

Figure 5:
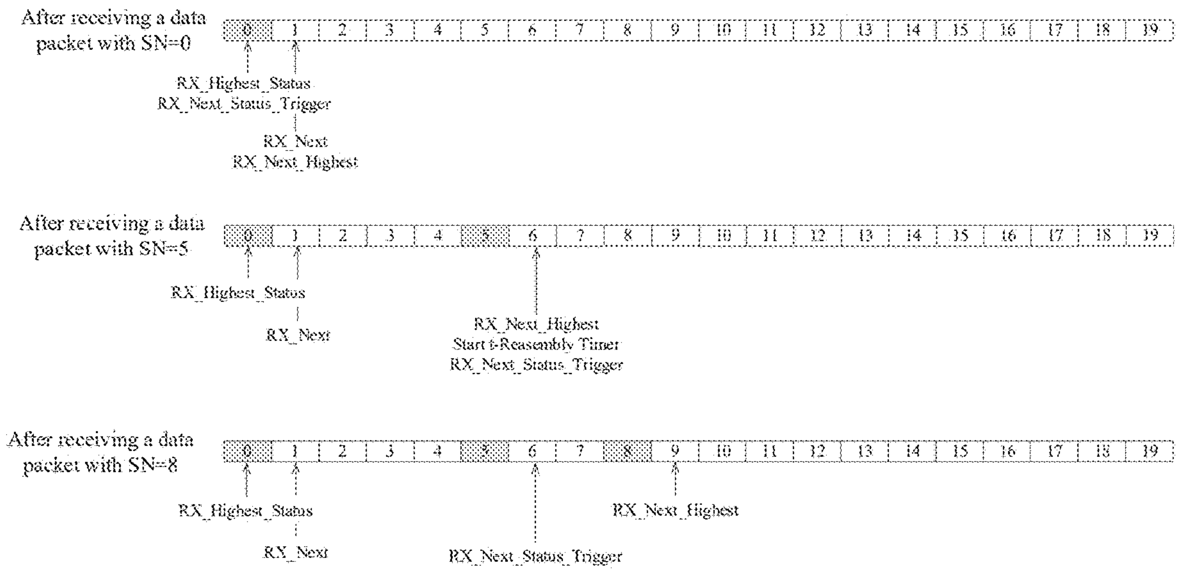
Figure 6:
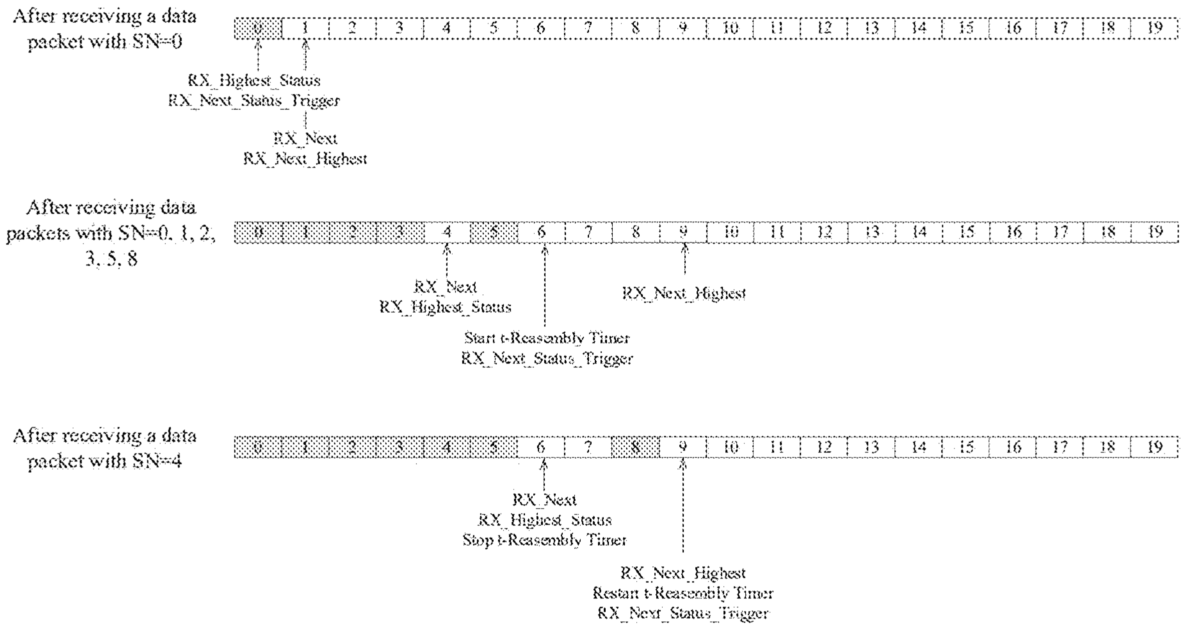

Based on the scenario shown in FIG. 4, if the receiver receives data packets with SN=1, SN=2, SN=3, and SN=4 during the operation of the reassembly timer, that is, before the reassembly timer times out, the corresponding status parameters are updated as shown in FIG. 5.

Specifically, as shown in FIG. 5, after the data packet with SN=4 is received, RX_Next is updated to SN=6, whether RX_Next_Status_Trigger is equal to RX_Next is determined, the reassembly timer is stopped, whether RX_Next_Highest is greater than RX_Next plus 1 is determined, the reassembly timer is restarted to wait for data packets with SN=6 and SN=7, and RX_Next_Status_Trigger is set to SN=9. Herein, stopping the reassembly timer does not trigger an RLC status report, and the RLC status report is only triggered when the reassembly timer times out. If the RLC status report is assembled at this time, ACK_SN=6 is filled in the RLC status report. The reassembly timer is reserved for HARQ retransmissions in physical layer during operation.

Figure 7:
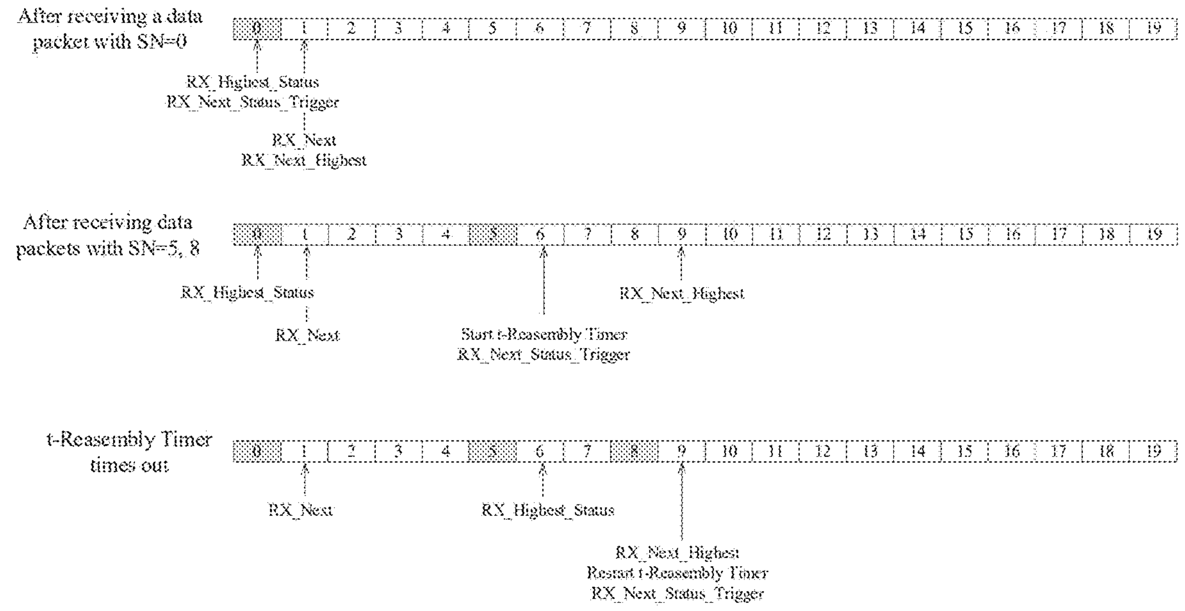

Based on the scenario shown in FIG. 5, if the receiver fails to receive the data packets with SN=1, SN=2, SN=3, and SN=4 during the operation of the reassembly timer, it transmits an RLC status report to the transmitter when the reassembly timer times out, so as to indicate the transmitter to perform retransmission, and the corresponding status parameters are updated as shown in FIG. 7.

Specifically, as shown in FIG. 7, when the reassembly timer times out, RX_Highest_Status is updated to SN=6, whether RX_Next_Highest is greater than RX_Highest_Status plus 1 is determined, the reassembly timer is restarted, and RX_Next_Status_Trigger is set to SN=9. If an RLC status report is assembled at this time, ACK_SN=0 and NACK_SN=1, 2, 3, 4 are filled in the RLC status report, and it is assumed that the physical layer does not report the data packets with SN=1, SN=2, SN=3, and SN=4.

Based on the above description, since data transmission in the AM has relatively large delay, for certain data services requiring high reliability and low delay, such as extended reality (XR) service, the AM is needed for data transmission, so as to ensure the reliability of data transmission. Additionally, XR service has burst characteristics, that is, service data arrives at the access layer in the form of data packet bursts, and the transmission delay budget is short. If transmission fails by the timeout of the delay budget, even if the data is successfully transmitted later, it is meaningless to the receiver and will waste transmission resources.

Therefore, in the embodiments of the present disclosure, the transmitter can transmit a notification to the receiver to inform the receiver which data packets are not transmitted. For example, as shown in FIG. 8, the first device as the receiver and the second device as the transmitter are taken as an example.

Figure 8:
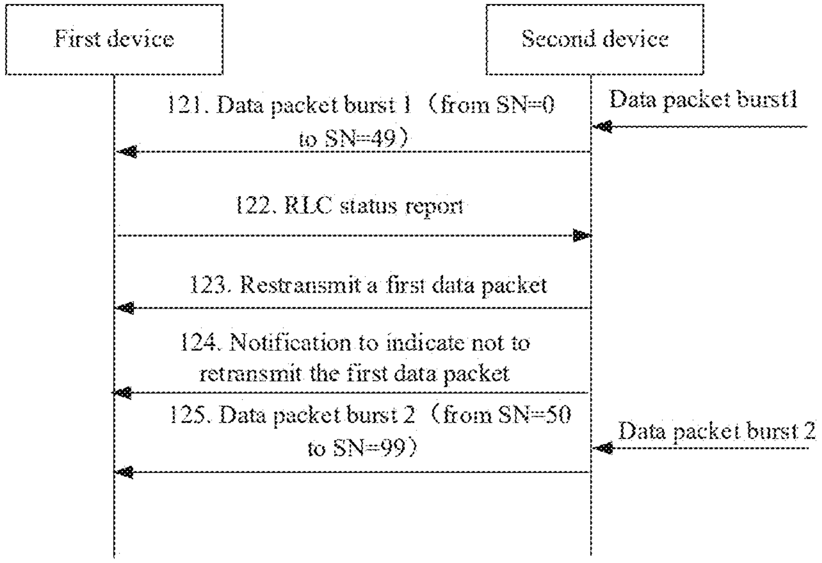
FIG. 8 is a schematic diagram of a transmitter indicating to a receiver that the transmitter does not retransmit a data packet.

As shown in FIG. 8, in step 121, transmitting, by the second device, a data packet burst 1 to the first device.

The data packet burst 1 includes multiple data packets with continuous serial numbers, such as 50 data packets from SN=0 to SN=49.

In step 122, transmitting, by the first device, an RLC status report to the second device.

During the initial transmission, some data packets are successfully transmitted, and other data packets are unsuccessfully transmitted. The first device notifies the second device which data packets are successfully transmitted and which data packets are unsuccessfully transmitted through the RLC status report. It is assumed that the first data packet in the data packet burst is unsuccessfully transmitted, the unsuccessfully transmitted data packets in the RLC status report include the first data packet.

In step 123, retransmitting, by the second device, the first data packet based on the RLC status report.

During the retransmission, if a PDCP discard timer maintained by the PDCP layer of the second device times out, the PDCP layer notifies the RLC layer that the discard timer for the first data packet times out. Generally, if the RLC layer has already started retransmitting the first data packet, the first data packet is not deleted but is continued to be transmitted.

In recent discussions, behavior of the transmitter has been changed. Even if the transmission of the first data packet has started in the RLC layer, the second device still deletes the first data packet and does not transmit the first data packet to the first device. Although the PDCP layer of the second device notifies the RLC layer that the unsuccessfully transmitted first data packet no longer needs to be transmitted, the first device is unaware of this. As a result, the first device triggers an RLC status report due to the timeout of the reassembly timer, but the second device does not initiate retransmission in response to the RLC status report.

Therefore, step 124 can be executed.

In step 124, transmitting, by the second device, a notification to the first device to indicate not to retransmit the first data packet.

That is to say, after the second device deletes the first data packet, the first device is informed that the second device does not retransmit the first data packet. The first device can then modify its status parameters accordingly and does not trigger an RLC status report.

In step 125, transmitting, by the second device, a data packet burst 2 to the first device.

The data packet burst 2 includes multiple continuous data packets, such as 50 data packets from SN=50 to SN=999.

As mentioned above, if the second device notifies the first device of non-transmitted data packets, additional signaling overhead is increased, thereby occupying extra air interface transmission resources.

In view of this, the embodiments of the present disclosure provide a data transmission solution in the AM. The first device determines whether to regard the unreceived data packet as received, so as to avoid unnecessary retransmissions, thereby reducing delay and saving transmission resources.

In the embodiments of the present disclosure, the data packet mentioned above includes, for example, a SDU and/or a fragment of the SDU, or a PDU and/or a fragment of the PDU. Taking the SDU and the fragment of the SDU as an example, each SDU has a serial number. Multiple fragments of an SDU have a same serial number, which is the serial number of the SDU to which they belong. The RLC status report generated by the first device can specifically indicate which SDUs or which fragments of the SDUs are successfully transmitted or unsuccessfully transmitted.

Figure 9:
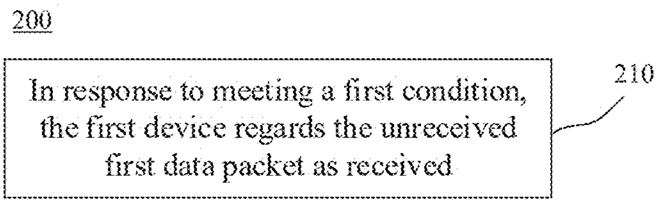
FIG. 9 is a schematic flowchart of a communication method according to an embodiment of the present disclosure.

FIG. 9 is a schematic flowchart of a communication method according to an embodiment of the present disclosure. The method 200 shown in FIG. 9 may be executed by the first device, which may be a receiver, with its peer device being the second device that may be a transmitter. As an example, the first device is a terminal device and the second device is a network device, or the first device is a network device and the second device is a terminal device. As shown in FIG. 9, the method 200 may include a portion or all of the following steps.

In step 210, in response to meeting a first condition, regarding, by the first device, an unreceived first data packet as received. The first condition is determined based on a second data packet received by the first device, where the first data packet and the second data packet are transmitted in an RLC AM.

In this case, the first device does not actually receive the first data packet, but can determine whether to regard the first data packet as received according to the first condition. For example, when the unreceived first data packet meets the first condition, the first data packet is regarded as received, and/or when the unreceived first data packet does not meet the first condition, the first data packet is not regarded as received.

Optionally, in a case that the first data packet is regarded as received, the first device does not trigger an RLC status report, or the first device triggers an RLC status report but the RLC status report does not indicate that the first data packet is unreceived.

Specifically, before the first data packet is regarded as received, the reassembly timer associated with the first data packet has not timed out. Thus, when the first data packet is regarded as received, the reassembly timer is stopped, so the RLC status report is not triggered by the timeout of the reassembly timer. When the first data packet is regarded as received, if the RLC status report is triggered for other reasons, since the first data packet is regarded as received, the RLC status report does not indicate that the first data packet is unreceived.

In addition, there is another scenario: if an RLC status report is triggered due to the timeout of the reassembly timer or other reasons before the first data packet is regarded as received, and the RLC status report includes information indicating that the first data packet is unreceived, the first device can cancel the RLC status report and retrigger the RLC status report based on the updated status parameters. The retriggered RLC status report does not indicate that the first data packet is unreceived. Herein, triggering the RLC status report does not necessarily mean that the RLC status report has been transmitted to the second device. Therefore, before the RLC status report is transmitted to the second device, the first device can cancel the RLC status report and regenerate the RLC status report.

Optionally, if the first device has triggered the RLC status report and transmitted the RLC status report indicating that the first data packet is unreceived, the first device regards the first data packet as received, the first device can retrigger the RLC status report after the first device regards the first data packet as received, so as to indicate to the second device that the first data packet has been received. In this case, the RLC status report transmitted for the second time should be considered authoritative.

In the above scenarios, the second device does not receive any indication from the first device that the first data packet is unsuccessfully transmitted, so it does not trigger retransmission of the first data packet, which is beneficial to reducing delay and saving transmission resources. Additionally, the first device does not initiate uplink scheduling requests (SR), buffer status reports (BSR), or other operations for the RLC status report, thereby simplifying the process of the first device.

In some implementations, the first condition is determined based on first information, and the first information is associated with the second data packet. For example, the first information includes time-related information and/or serial number information of the second data packet.

Optionally, the time-related information of the second data packet includes at least one of the following: a reception moment of the second data packet, a transmission moment of the second data packet, and a timestamp in a real time transport protocol (RTP) header of the second data packet.

The reception moment of the second data packet refers to a moment when the first device receives the second data packet. The timestamp in the RTP header of the second data packet refers to a sampling moment or a generation moment of the second data packet, and the RTP layer is a higher protocol layer located above the RRC layer and the IP layer. The transmission moment of the second data packet refers to a moment when the second device transmits the second data packet.

Since the air interface transmission of data packets takes time, the transmission moment of the second data packet is different from the reception moment of the second data packet, and a difference between the transmission moment of the second data packet and the reception moment of the second data packet can be at least an air interface transmission duration. For example, the first device can determine the transmission moment of the second data packet according to the reception moment and the air interface transmission duration of the second data packet, and the second device can also determine the reception moment of the second data packet according to the transmission moment and the air interface transmission duration of the second data packet.

The type of time-related information of the second data packet is not limited by the present disclosure. For example, the type of time-related information of the second data packet may include one or more of the following: absolute time, system frame number (SFN) of a current cell, time slot number, and symbol.

The first device can determine which unreceived data packets are regarded as received based on the time-related information of the second data packet. For example, the time-related information of the second data packet is configured to determine a waiting time of the first data packet. If the first data packet is still not received after the waiting time, the first data packet is regarded as received. That is to say, the first condition includes not being received after the waiting time, or not being received before the waiting time.

The first device also determines which unreceived data packets are regarded as received based on the serial number of the second data packet. For example, if a difference between a serial number of the first data packet and a serial number of the second data packet is less than a preset value, the first data packet is regarded as received. That is to say, the first condition includes that the difference between the serial number of the first data packet and the serial number of the second data packet is less than the preset value.

The method of obtaining the first information is not limited by the embodiments of the present disclosure. For example, the first information may be obtained by at least one of the following methods: pre-agreeing, determining by the first device, and transmitting by the second device.

If the first information is transmitted by the second device, optionally, the first information may be carried in at least one of the following: a PDCP header, a RLC header, a MAC header, a PDCP control signaling, a RLC control signaling, and a MAC CE.

Hereinafter, in conjunction with the first embodiment and the second embodiment, how the first device uses the first information to determine whether to regard the unreceived first data packet as received is described in detail.

First Embodiment

In the first embodiment, the second data packet and the first data packet are located within a same reception window.

In some implementations, the second data packet includes at least one of the following: a data packet with a maximum serial number among received data packets in the reception window, a latest received data packet among received data packets in the reception window, a data packet with a minimum serial number among received data packets in the reception window, and an earliest received data packet among received data packets in the reception window.

In some implementations, the first information includes time-related information of the second data packet, which is configured to determine a first moment. If the first data packet is still not received after the first moment (or not received before the first moment), the first data packet is regarded as received. That is to say, the first condition includes not being received before the first moment or not being received after the first moment.

The first device can determine the first moment based on the time-related information of the second data packet, and then determine which unreceived data packets can be regarded as received according to the first moment. For example, if the current moment is the first moment and the first device still has not received the first data packet, the first device gives up waiting for the first data packet and regards the first data packet as received.

In some implementations, the first moment is at a first preset duration after a moment indicated by the time-related information of the second data packet. For example, if the time-related information of the second data packet includes the reception moment or the timestamp in the RTP header of the second data packet, the first moment may be located at the first preset duration after the reception moment or the timestamp of the second data packet. The first preset duration can be pre-agreed or transmitted by the second device.

In some implementations, if the difference between the serial number of the first data packet and the serial number of the second data packet is less than a first preset value, the first data packet is regarded as received. The first preset value can be pre-agreed or transmitted by the second device. For example, the first preset value is a positive integer. In other words, the first condition includes that the difference between the serial number of the first data packet and the serial number of the second data packet is less than the first preset value.

The possible positions of the first moment will be described by way of example.

For example, if a data packet with a maximum serial number among received data packets in the current reception window is the second data packet, the first device can determine whether to wait for unreceived data packets (such as the first data packet) before the second data packet based on the reception moment of the second data packet. Specifically, if the reception moment of the second data packet is T1 and the first preset duration is assumed to be T1', the first device determines not to wait for the first data packet and regards the first data packet as received when the current moment reaches T1+T1'.

For another example, if a data packet with a maximum serial number among received data packets in the current reception window is the second data packet, the first device can determine whether to wait for unreceived data packets (such as the first data packet) before the second data packet based on the timestamp in the RTP header of the second data packet. Specifically, if the timestamp in the RTP header of the second data packet is T2 and the first preset duration is assumed to be T2', the first device determines not to wait for the first data packet and regards the first data packet as received when the current moment reaches T2+T2'.

For another example, if a latest received data packet among received data packets in the current reception window is the second data packet, the first device can determine whether to wait for unreceived data packets (such as the first data packet) before the second data packet based on the reception moment of the second data packet. Specifically, if the reception moment of the second data packet is T3 and the first preset duration is assumed to be T3', the first device determines not to wait for the first data packet and regards the first data packet as received when the current moment reaches T3+T3'.

For another example, if a latest received data packet among received data packets in the current reception window is the second data packet, the first device can determine whether to wait for unreceived data packets (such as the first data packet) before the second data packet based on the timestamp in the RTP header of the second data packet. Specifically, if the timestamp in the RTP header of the second data packet is T4 and the first preset duration is assumed to be T4', the first device determines not to wait for the first data packet and regards the first data packet as received when the current moment reaches T4+T4'.

It should be noted that the data packet with the maximum serial number may be different from the last received data packet. The data packets transmitted by the second device according to the order of the serial number may be received by the first device out of order due to reasons such as HARQ retransmissions. For example, referring to FIG. 7, the data packet with the serial number SN=5 may be received before the data packet with the serial number SN=1.

For another example, if a data packet with a minimum serial number among received data packets in the current reception window is the second data packet, the first device can determine whether to wait for other unreceived packets in the current reception window (such as all or a portion data packets in the reception window, including the first data packet) based on the reception moment of the second data packet. Specifically, if the reception moment of the second data packet is T5 and the first preset duration is assumed to be T5', when the current moment reaches T5+T5', the first device determines not to wait for all the data packets in the reception window, or determines not to wait for unreceived data packets in the reception window within the duration ranging from T5 to T5+T5' (i.e., [T5, T5+T5']), and regards the data packets as received.

For another example, if a data packet with a minimum serial number among received data packets in the current reception window is the second data packet, the first device can determine whether to wait for other unreceived packets in the current reception window (such as all or a portion data packets in the reception window, including the first data packet) based on the timestamp in the RTP header of the second data packet. Specifically, if the timestamp in the RTP header of the second data packet is T6 and the first preset duration is assumed to be T6', when the current moment reaches T6+T6', the first device determines not to wait for all the data packets in the reception window, or determines not to wait for unreceived data packets in the reception window within the duration ranging from T6 to T6+T6' (i.e., [T6, T6+T6']), and regards the data packets as received.

For another example, if an earliest received data packet among received data packets in the current reception window is the second data packet, the first device can determine whether to wait for other unreceived packets in the current reception window (such as all or a portion data packets in the reception window, including the first data packet) based on the reception moment of the second data packet. Specifically, if the reception moment of the second data packet is T7 and the first preset duration is assumed to be T7', when the current moment reaches T7+T7', the first device determines not to wait for all the data packets in the reception window, or determines not to wait for unreceived data packets in the reception window within the duration ranging from T7 to T7+T7' (i.e., [T7, T7+T7']), and regards the data packets as received.

For another example, if an earliest received data packet among received data packets in the current reception window is the second data packet, the first device can determine whether to wait for other unreceived packets in the current reception window (such as all or a portion data packets in the reception window, including the first data packet) based on the timestamp in the RTP header of the second data packet. Specifically, if the timestamp in the RTP header of the second data packet is T8 and the first preset duration is assumed to be T8', when the current moment reaches T8+T8', the first device determines not to wait for all the data packets in the reception window, or determines not to wait for unreceived data packets in the reception window within the duration ranging from T8 to T8+T8' (i.e., [T8, T8+T8']), and regards the data packets as received.

Similarly, the data packet with the minimum serial number may be different from the earliest received data packet. The data packets transmitted by the second device according to the order of the serial number may be received by the first device out of order due to reasons such as HARQ retransmissions. For example, the data packet with the serial number SN=0 may be received after the data packet with the serial number SN=1.

It can be understood that the first data packet and the second data packet are located in the same reception window, or the first data packet and the second data packet are located within a predetermined time period of the same reception window. A starting moment of the predetermined time period is determined based on the time-related information of the second data packet, such as a moment corresponding to the reception moment or the timestamp in the RTP header of the second data packet, and an ending moment of the predetermined time period may be the above first moment. For example, the predetermined time period may be any one of the above [T5, T5+T5'], [T6, T6+T6'], [T7, T7+T7'] or [T8, T8+T8'].

As another example, if the second data packet is the earliest received data packet or the data packet with the minimum serial number in the current reception window, the first device may also determine not to wait for data packets with M1 serial numbers after the serial number of the second data packet, or if the second data packet is the latest received data packet or the data packet with the maximum serial number in the current reception window, the first device may also determine not to wait for data packets with M2 serial numbers before the serial number of the second data packet. M1 and M2 may be pre-agreed or transmitted by the second device.

Second Embodiment

In the second embodiment, the first data packet and the second data packet belong to a same data packet burst. For example, the second data packet is a first data packet in the data packet burst.

The first data packet in the data packet burst may be determined by the first device or indicated by the second device. For example, the serial number of the second data packet is the minimum serial number in the data packet burst received by the first device. Alternatively, the serial number of the second data packet is indicated by the second device.

Specifically, if the first data packet in the data packet burst is determined by the first device, the first device can take the data packet with the minimum serial number in the current data packet burst received by the first device as the first data packet of the data packet burst received by the first device. However, the data packet is not necessarily the first data packet in the data packet burst transmitted by the second device. As an example, the data packet burst includes 50 data packets with serial numbers from SN=0 to SN=49, with the first data packet in the data packet burst with the serial number SN=0. It is assumed that the minimum serial number received by the first device is SN=1, and the data packet with SN=0 has not been received due to HARQ retransmissions or other reasons, the first device regards the data packet with SN=1 as the first data packet in the current data packet burst. For the first device, the data packet burst includes 50 data packets from SN=1 to SN=50. However, due to the enhancement of RLC retransmission for the second device in NR Release 19, the transmitter retransmits data packets more quickly, so the probability of the scenario occurring is relatively low.

If the first data packet in the data packet burst is transmitted by the second device, the second device can transmit the serial number of the first data packet in the data packet burst to the first device. As an example, the data packet burst includes 50 data packets with serial numbers from SN=0 to SN=49, so the second device can transmit the first data packet in the data packet burst with the serial number SN=0 to the first device. Even if the first device first receives the data packet with the serial number SN=1, the first device still regards the data packet in the data packet burst with SN=0 as the first data packet in response to receiving the data packet with SN=0.

In some implementations, the first information includes time-related information of the second data packet, and the time-related information of the second data packet is configured to determine a second moment. If the first data packet is still not received after the second moment (or not received before the first moment), the first data packet is regarded as received. That is to say, the first condition includes not being received before the second moment or still not being received after the first moment.

The first device may determine the second moment based on the time-related information of the second data packet, and then determine which unreceived data packets can be regarded as received according to the second moment. For example, if the current moment reaches the second moment and the first device still has not received the first data packet, the first device gives up waiting for the first data packet and regards the first data packet as received.

In some implementations, the second moment may be located at a second preset duration after a moment indicated by the time-related information of the second data packet. For example, if the time-related information of the second data packet includes the reception moment or the transmission moment of the second data packet, the second moment may be located at the second preset duration after the reception moment or the transmission moment of the second data packet.

Several methods for determining the second preset duration are provided below.

First Method

In some implementations, the first information further includes time-related information of the data packet burst, and the second preset duration is determined based on the time-related information of the data packet burst.

Optionally, the time-related information of the data packet burst includes at least one of the following: an air interface transmission delay budget of the data packet burst, timeout information of the data packet burst, and a clearing moment of the data packet burst indicated by the second device.

The air interface transmission delay budget of the data packet burst is related to a moment when the data packet burst arrives at the second device. There may be clock jitter in an arrive moment of the data packet burst at the air interface of the second device. If the data packet burst arrives late at the air interface of the second device, the air interface transmission delay budget is shorter. If the data packet burst arrives early at the air interface of the second device, the air interface transmission delay budget is longer.

The timeout information of the data packet burst includes at least one of the following: a timeout moment of the data packet burst, a timeout moment of a first data packet in the data packet burst, a timeout moment of a last data packet in the data packet burst, a timeout moment of an earliest timeout data packet in the data packet burst, and a timeout moment of a latest timeout data packet in the data packet burst.

Generally, the timeout moments of the data packets in the data packet burst may be different. Since the importance levels of the data packets in the data packet burst are different, the transmission delay budget corresponding to the data packets in the data packet burst are different. A data packet with a higher importance level may have a larger transmission delay budget, and a data packet with a lower importance level may have a smaller delay budget, so the timeout moments of the data packets do not necessarily increase sequentially. If it is assumed that the arrival moments of the data packets in the data packet burst are the same (for example, forcibly aligning the arrival moments of the data packets), the timeout moments of the data packets are identical, which is defined as the timeout moment of the above data packet burst.

The clearing moment of the data packet burst indicated by the second device refers to a moment determined by the second device not to wait for the first data packet. If the current moment reaches the clearing moment and the first device has not received the first data packet, the first device no longer needs to wait for the first data packet and regards the first data packet as received.

The type of the time-related information of the data packet burst is not limited by the embodiments of the present disclosure. For example, the time-related information of the data packet burst includes at least one of the following: absolute time, system frame number, time slot number, and symbol.

In some implementations, the second preset duration is recorded by a timer of the first device, and a starting moment of the timer is a moment indicated by the time-related information of the second data packet, such as a reception moment or a transmission moment of the second data packet. Herein, the reception moment or the transmission moment of the second data packet, that is, a reception moment or a transmission moment of the first data packet in the current data packet burst, may be a reception moment or a transmission moment of a data packet with a minimum serial number in the data packet burst. As mentioned above, the data packet with the minimum serial number in the data packet burst can be determined by the first device or transmitted by the second device.

For example, if the first data packet in the data packet burst is the second data packet, the first information transmitted by the second device to the first device includes the time-related information of the data packet burst, such as the air interface transmission delay budget of the data packet burst, the timeout information of the data packet burst, or the clearing moment of the data packet burst. If the reception moment or the transmission moment of the second data packet is T9, and the air interface transmission delay budget, the timeout moment of the data packet burst, or the clearing moment of the data packet burst is equal to the second preset duration T9', when the current moment reaches T9+T9', the first device determines not to wait for all or a portion of the unreceived data packets in the data packet burst (including the first data packet), and regards the data packets as received. For example, the portion of the data packets may refer to the data packets with lower importance levels.

For another example, the first data packet in the data packet burst is the second data packet, the terminal device starts the timer in response to receiving the second data packet. If the reception moment or the transmission moment of the second data packet is T10, and the second preset duration is T10', the first device starts the timer at T10. When a duration recorded by the timer reaches the second preset duration, and the first device has not received the first data packet, the first device no longer needs to wait for all or a portion the unreceived data packets in the data packet burst (including the first data packet), and regards the data packets as received. For example, the portion of the data packets may refer to the data packets with lower importance levels.

Further, in some implementations, the first information may further include a number of data packets in the data packet burst and/or a data volume of the data packet burst, which are configured to determine data packets belonging to the data packet burst, that is, to determine which data packets belong to the data packet burst. For example, the first device can determine which data packets are included in the data packet burst based on the serial number of the first data packet in the data packet burst (i.e., the serial number of the second data packet) and the number of data packets in the data packet burst. It is assumed that the second data packet has a serial number SN=0 and the data packet burst includes 50 data packets, the data packet burst includes data packets with serial numbers from SN=0 to SN=49. In this way, when the current moment reaches the second moment, the unreceived data packets (such as the first data packet) belonging to the same data packet burst as the second data packet can be regarded as received without waiting.

Second Method

In some implementations, the first information further includes the number of data packets in the data packet burst, the second preset duration is an elapsed duration for the first device to receive the data packets with the number of data packets staring from receiving the second data packet. For example, if the serial number of the second data packet is SN=0 and the data packet burst includes 50 data packets, the second preset duration is a duration taken for the first device to receive all data packets from SN=0 to SN=49.

The first device may determine a second moment based on the reception moment or the transmission moment of the second data packet and the number of data packets in the data packet burst. Subsequently, the first device determines which unreceived data packets can be regarded as received according to the second moment. For example, the second moment is a moment when the first device completes receiving the data packets with the number of data packets starting from receiving the second data packet. If the current moment reaches the second moment and the first device still has not received the first data packet in the data packet burst, the first device gives up waiting for the first data packet and regards the first data packet as received.

In some implementations, the number of data packets carried in the first information is recorded by a counter of the first device, and a starting time of the counter is the reception moment or the transmission moment of the second data packet. Herein, the reception moment or the transmission moment of the second data packet, that is, a reception moment or a transmission moment of the first data packet in the current data packet burst, may be a reception moment or a transmission moment of a data packet with a minimum serial number in the data packet burst. As mentioned above, the data packet with the minimum serial number in the data packet burst can be determined by the first device or transmitted by the second device.

For example, if the first data packet in the data packet burst is the second data packet, the first information transmitted by the second device to the first device includes the number of data packets of the data packet burst. If the reception moment or the transmission moment of the second data packet is T11, the number of data packets in the data packet burst is N, the moment when the first device completes receiving N data packets starting from T11 is T11', when the current moment reaches T11+T11', the first device determines not to wait for all or a portion of the unreceived data packets in the data packet burst (including the first data packet), and regards the data packets as received. For example, the portion of the data packets may refer to the data packets with lower importance levels.

For another example, the first data packet in the data packet burst is the second data packet, the terminal device starts the counter in response to receiving the second data packet. If the reception moment or the transmission moment of the second data packet is T12, the first device starts the timer at T12, the number of data packets in the data packet burst is N, and a moment corresponding to a value recorded by the counter reaches T12', the first device has not received the first data packet when the current moment reaches T12+T12', the first device no longer needs to wait for all or a portion of the unreceived data packets in the data packet burst (including the first data packet), and regards the data packets as received. For example, the portion of the data packets may refer to the data packets with lower importance levels.

In the second embodiment, in other implementations, the first information includes serial number information of the second data packet. If a difference between a serial number of the first data packet and a serial number of the second data packet is smaller than a second preset value, the first data packet is regarded as received. The second preset value may be pre-agreed or transmitted by the second device. For example, the second preset value is a positive integer.

That is to say, the first condition includes that the difference between the serial number of the first data packet and the serial number of the second data packet is smaller than the second preset value. The first device regards the unreceived data packets among the data packets corresponding to serial numbers with the difference smaller than the second preset value as received.

How the first device determines whether to regard the unreceived data packets as received is described above. Hereinafter, how the first device determines whether to perform the first operation is described.

In some implementations, the communication method according to the embodiments of the present disclosure further includes: determining, by the first device, whether to perform a first operation according to second information. For example, the first operation includes determining whether to regard the unreceived data packets as received.

Optionally, the second information includes instruction information for instructing whether to perform the first operation, that is, the second information is configured to instruct the first device whether to perform the first operation. Alternatively, the second information can include information associated with the first operation.

The first operation is associated with at least one of the following: a logical channel, a logical channel group, a service type, and information of a terminal device.

If the second information indicates a specific logical channel, the first device performs the first operation only for data packets transmitted on that logical channel. If the second information indicates a specific logical channel group, the first device performs the first operation only for data packets transmitted on the logical channel group. If the second information indicates a specific service type, such as XR service, the first device performs the first operation only for data packets of the service type, such as XR service. If the second information indicates some or a certain type of terminal device, the first device performs the first operation if the first device is the terminal device indicated by the second information.

The information of the terminal device includes at least one of the following: protocol version supported by the terminal device, and device information of the terminal device. Taking the protocol version supported by the terminal device as an example, the terminal devices with high version, such as Release 19 and above, can perform the first operation, and the terminal devices with low version, such as Release 18 and below, do not perform the first operation.

The second information includes one or more pieces of information associated with the first operation. For example, if the second information includes a logical channel group and a service type, such as XR service, the first device performs the first operation on data packets on a logical channel within the logical channel group for transmitting the XR service. For another example, if the second information includes information of a terminal device and information of a logical channel, the first device performs the first operation on data packets on the logical channel indicated by the second information when the first device is the terminal device indicated by the second information.

Further, optionally, the second information can indicate the method for performing the first operation, that is, which of the above methods for the first device determines whether to regard the unreceived packets as received. Alternatively, the first device can independently select one of the methods to determine whether to regard the unreceived packets as received.

Optionally, the second information is obtained by at least one of the following: pre-agreeing, determining by the first device, and transmitting by the second device.

If the second information is transmitted by the second device, the second information can be carried by at least one of the following: a radio resource control (RRC) signaling, and a RLC control signaling.

In some implementations, the first device can further transmit third information to the second device. The third information is configured to indicate whether the first device has a capability to perform the first operation. The capability is associated with at least one of the following: frequency range (FR), a logical channel, a logical channel group, or information of a terminal device. Optionally, the third information may also be provided by other devices. For example, if the first device is the terminal device and the second device is the network device, the third information may be provided by the core network to the second device.

Based on the above description, if the first device determines to regard the unreceived first data packet as received, the first device needs to update the status parameter maintained by the first device, such as the first parameter (RX_Next), the second parameter (RX_Highest_Status), the third parameter (RX_Next_Highest), and fourth parameter (RX_Next_Status_Trigger).

In some implementations, in a case that the unreceived first data packet is regarded as received, the status parameter maintained by the first device is updated based on status of the data packets with a second serial number and serial number before the second serial number.

The second serial number can be defined in the follow two methods: in the case that the first data packet is regarded as received, the second serial number is the serial number of the first data packet. Alternatively, in a case that a plurality of unreceived data packets are regarded as received, the second serial number is a serial number of a last data packet in the plurality of data packets, and the plurality of data packets include the first data packet. In other implementations, the second serial number can be indicated by the second device.

In some implementations, the status parameter can be updated in one or more of the following methods: the first parameter is updated to a serial number of a next unreceived data packet after the second serial number, the second parameter is updated to a serial number of a next unreceived data packet after a next received data packet after the first parameter, the serial number indicated by the third parameter is updated to the serial number indicated by the third parameter plus 1 in response to being located before the second serial number, or the serial number indicated by the third parameter remains unchanged in response to being located after the second serial number, and the fourth parameter is updated to a serial number of a next segment of unreceived data packet after the second serial number. The next segment of unreceived data packet refers to one or more continuously unreceived data packets. For example, the data packets with SN=6 and SN=7 in FIG. 5 can be referred to as a segment of the unreceived data packets, and the data packets with SN=1, SN=2, SN=3, and SN=4 can be referred to as another segment of the unreceived data packets.

Based on the scenario shown in FIG. 5, if the first device has not received the data packets with SN=1, SN=2, SN=3, and SN=4 during the operation of the reassembly timer and determines not to wait for the data packets with SN=1, SN=2, SN=3, and SN=4, the second serial number is SN=4. The first device regards the data packets with SN=1, SN=2, SN=3, and SN=4 as received. In this case, the first device regards the data packets with SN=1, SN=2, SN=3, and SN=4 as received, and RX_Next is updated to SN=6. RX_Next_Highest is SN=9, which is located after the second serial number with SN=4, so it remains unchanged. Whether RX_Next_Status_Trigger is equal to RX_Next is determined, and the reassembly timer is stopped. Whether RX_Next_Highest is greater than RX_Next plus 1 is determined, the reassembly timer is restarted to wait for the data packets with SN=6 and SN=7, and RX_Next_Status_Trigger is updated to SN=9. If the first device determines not to wait for the data packets with SN=6 and SN=7, RX_Highest_Status is updated to SN=9. If the first device still needs to wait for the data packets with SN=6 and SN=7, RX_Highest_Status is updated to SN=6.

Optionally, when the first device updates the status parameter maintained by the receiver, the first device can transmit fourth information to the second device, where the fourth information is used for the second device to update the status parameter maintained by the transmitter. For example, the fourth information can indicate whether the first device has updated the status parameter, or the fourth information includes at least one of the updated status parameters.

Figure 10:
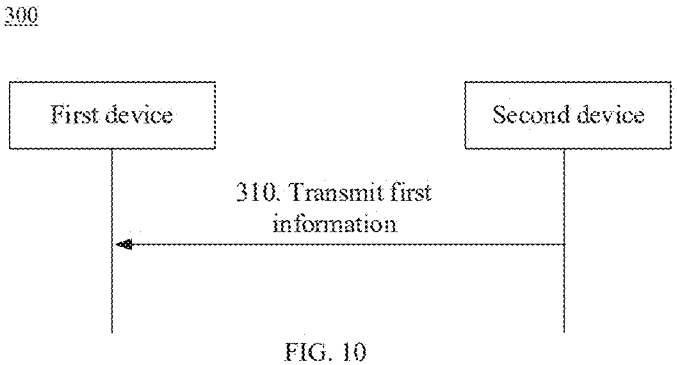
FIG. 10 is a schematic flowchart of a communication method according to another embodiment of the present disclosure.

FIG. 10 is a flowchart of a communication method according to another embodiment of the present disclosure. The method 300 shown in FIG. 10 can be executed by a second device, where the second device is be a receiver and its peer device is a first device, which is a receiver. As an example, the first device is a terminal device and the second device is a network device, or the first device is a network device and the second device is a terminal device. As shown in FIG. 10, the method 300 may include a portion or all of the following steps.

In step 310, transmitting, by the second device, first information to the first device. The first information is configured to determine whether to regard an unreceived first data packet as received. The first information is associated with a second data packet received by the first device, and the first data packet and the second data packet are transmitted in an RLC AM.

It can be understood that the content included in the first information described in the method 300 can be all content that can be provided by the second device among the possible content of the first information described in the above method 200.

In some implementations, the first data packet is regarded as received. The first device does not trigger an RLC status report, or the first device triggers the RLC status report, and the RLC status report does not indicate that the first data packet is unreceived.

In some implementations, the first data packet and the second data packet belong to a same data packet burst.

In some implementations, the second data packet is a first data packet in the data packet burst.

In some implementations, the second data packet is a data packet with a minimum serial number in the data packet burst received by the first device, or a serial number of the second data packet is indicated by a second device.

In some implementations, the first information is configured to determine a second moment. In response to not receiving the first data packet after the second moment, the first data packet is regarded as received.

In some implementations, the first information is configured to determine a second preset duration, and the second moment is at the second preset duration after a reception moment or a transmission moment of the second data packet.

In some implementations, the first information includes time-related information of the data packet burst, and the time-related information of the data packet burst is configured to determine the second preset duration.

In some implementations, the time-related information of the data packet burst includes at least one of the following: an air interface transmission delay budget of the data packet burst, timeout information of the data packet burst, and a clearing moment of the data packet burst.

In some implementations, the timeout information of the data packet burst includes at least one of the following: a timeout moment of the data packet burst, a timeout moment of a first data packet in the data packet burst, a timeout moment of a last data packet in the data packet burst, a timeout moment of an earliest timeout data packet in the data packet burst, and a timeout moment of a latest timeout data packet in the data packet burst.

In some implementations, the second preset duration is recorded by a timer of the first device, and a starting moment of the timer is the reception moment or the transmission moment of the second data packet.

In some implementations, the time-related information of the data packet burst includes at least one of the following: absolute time, system frame number, time slot number, and symbol.

In some implementations, the first information further includes a number of data packets in the data packet burst and/or a data volume of the data packet burst, and the number of data packets in the data packet burst and/or the data volume of the data packet burst are configured to determine data packets belonging to the data packet burst.

In some implementations, the first information includes a number of data packets in the data packet burst, and the second preset duration is a duration for the first device to receive data packets with the number of data packets starting from receiving the second data packet.

In some implementations, the number of data packets is recorded by a counter of the first device, and a starting moment of the counter is the reception moment or the transmission moment of the second data packet.

In some implementations, the first information includes serial number information of the second data packet. In response to a difference between a serial number of the first data packet and a serial number of the second data packet being smaller than a second preset value, the first data packet is regarded as received.

In some implementations, the first information is carried by at least one of the following: a packet data convergence protocol (PDCP) header; a RLC header; a media access control (MAC) header; a PDCP control signaling; a RLC control signaling; a media access control control element (MAC CE).

In some implementations, transmitting, by the second device, second information to the first device, where the second information is configured to determine whether to perform a first operation, and the first operation includes determining whether to regard an unreceived data packet as received.

In some implementations, the second information includes instruction information for instructing whether to perform the first operation, or, the second information includes information associated with the first operation.

In some implementations, the first operation is associated with at least one of the following: a logical channel, a logical channel group, a service type, and information of a terminal device.

In some implementations, the information of the terminal device includes at least one of the following: protocol version supported by the terminal device, and device information of the terminal device.

In some implementations, the second information is carried by at least one of the following: a radio resource control (RRC) signaling, and a RLC control signaling.

In some implementations, the method 300 further includes: receiving, by the second device, third information transmitted by the first device. The third information is configured to indicate whether the first device has a capability to perform the first operation.

In some implementations, the capability is associated with at least one of the following: frequency range, a logical channel, a logical channel group, and information of a terminal device.

In some implementations, in response to regarding the first data packet as received, a status parameter of data packets maintained by the first device is updated based on status of data packets with a second serial number and serial numbers before the second serial number.

In some implementations, in a case that the first data packet is regarded as received, the second serial number is a serial number of the first data packet, or, in a case that a plurality of unreceived data packets are regarded as received, the second serial number is a serial number of a last data packet in the plurality of data packets, and the plurality of data packets includes the first data packet.

In some implementations, the status parameter includes at least one of the following: a first parameter, configured to indicate a next serial number after a serial number of a last completely correctly received data packet, a second parameter, configured to indicate an updated serial number upon timeout of a reassembly timer, a third parameter, configured to indicate a next serial number after a serial number of a received data packet with a maximum received serial number, and a fourth parameter, configured to indicate a next incorrectly received serial number after a serial number of a data packet triggering the reassembly timer.

In some implementations, the first parameter is updated to a serial number of a next unreceived data packet after the second serial number, the second parameter is updated to a serial number of a next unreceived data packet after a next received data packet after the first parameter, the serial number indicated by the third parameter is updated to the serial number indicated by the third parameter plus 1 in response to being located before the second serial number, or the serial number indicated by the third parameter remains unchanged in response to being located after the second serial number, and the fourth parameter is updated to a serial number of a next segment of unreceived data packets after the second serial number.

In some implementations, the method 300 further includes: receiving, by the second device, an RLC status report transmitted by the first device. The RLC status report is an RLC status report triggered by the first device based on the updated status parameter.

In some implementations, the first data packet includes a service data unit (SDU) and/or a fragment of the SDU.

It can be understood that the specific details of various implementations of the method 300 shown in FIG. 10 can make reference to the relevant descriptions in the method 200. For the sake of description, details are not repeated herein.

The method embodiments of the present disclosure have been described in detail above in combination with FIG. 1 to FIG. 10. The device embodiments of the present disclosure will be described in detail in combination with FIG. 11 to FIG. 13 below. It should be understood that the descriptions of the device embodiments correspond to the description of the method embodiments. Therefore, for the parts that are not described in detail, reference may be made to the previous method embodiments.

Figure 11:
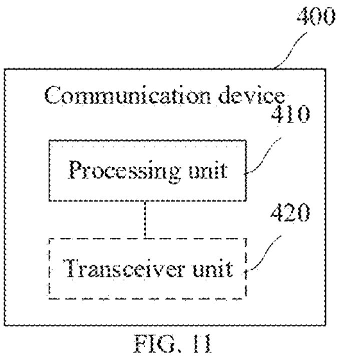
FIG. 11 is a schematic block diagram of a communication device according to an embodiment of the present disclosure.

FIG. 11 is a schematic diagram of a communication device according to an embodiment of the present disclosure. The communication device 400 shown in FIG. 11 may be the above first device. The communication device 400 includes a processing unit 410. Optionally, the communication device 400 further includes a transceiver unit 420. The processing unit 410 is configured to determine, according to first information, whether to regard an unreceived first data packet as received, where the first information is associated with a second data packet received by the first device, and the first data packet and the second data packet are transmitted in RLC AM.

In some implementations, the first data packet is regarded as received. The first device does not trigger an RLC status report, or the first device triggers the RLC status report, and the RLC status report does not indicate that the first data packet is unreceived.

In some implementations, the first information includes time-related information and/or serial number information of the second data packet.

In some implementations, the time-related information of the second data packet includes at least one of the following: a reception moment of the second data packet, a transmission moment of the second data packet, and a timestamp in a real time transport protocol (RTP) header of the second data packet.

In some implementations, a difference between the transmission moment of the second data packet and the reception moment of the second data packet is an air interface transmission duration.

In some implementations, the time-related information of the second data packet includes at least one of the following: absolute time, system frame number, time slot number, and symbol.

In some implementations, the first data packet and the second data packet are located in a same reception window.

In some implementations, the second data packet includes at least one of the following: a data packet with a maximum serial number among received data packets in the reception window, a latest received data packet among received data packets in the reception window, a data packet with a minimum serial number among received data packets in the reception window, and an earliest received data packet among received data packets in the reception window.

In some implementations, the first information includes time-related information of the second data packet, and the time-related information of the second data packet is configured to determine a first moment. In response to not receiving the first data packet after the first moment, the first data packet is regarded as received.

In some implementations, the time-related information of the second data packet includes a reception moment or a timestamp in a RTP header of the second data packet. The first moment is at a first preset duration after the reception moment or the timestamp of the second data packet.

In some implementations, the first information includes serial number information of the second data packet. In response to a difference between a serial number of the first data packet and a serial number of the second data packet being smaller than a first preset value, the first data packet is regarded as received.

In some implementations, the first data packet and the second data packet belong to a same data packet burst.

In some implementations, the second data packet is a first data packet in the data packet burst.

In some implementations, the second data packet is a data packet with a minimum serial number in the data packet burst received by the first device, or a serial number of the second data packet is indicated by a second device.

In some implementations, the first information includes time-related information of the second data packet, and the time-related information of the second data packet is configured to determine a second moment. In response to not receiving the first data packet after the second moment, the first data packet is regarded as received.

In some implementations, the time-related information of the second data packet includes a reception moment or a transmission moment of the second data packet. The second moment is at a second preset duration after the reception moment or the transmission moment of the second data packet.

In some implementations, the first information further includes time-related information of the data packet burst, and the second preset duration is determined based on the time-related information of the data packet burst.

In some implementations, the time-related information of the data packet burst includes at least one of the following: an air interface transmission delay budget of the data packet burst, timeout information of the data packet burst, and a clearing moment of the data packet burst.

In some implementations, the timeout information of the data packet burst includes at least one of the following: a timeout moment of the data packet burst, a timeout moment of a first data packet in the data packet burst, a timeout moment of a last data packet in the data packet burst, a timeout moment of an earliest timeout data packet in the data packet burst, and a timeout moment of a latest timeout data packet in the data packet burst.

In some implementations, the time-related information of the data packet burst includes at least one of the following: absolute time, system frame number, time slot number, and symbol.

In some implementations, the second preset duration is recorded by a timer of the first device, and a starting moment of the timer is the reception moment or the transmission moment of the second data packet.

In some implementations, the first information further includes a number of data packets in the data packet burst and/or a data volume of the data packet burst, and the number of data packets in the data packet burst and/or the data volume of the data packet burst are configured to determine data packets belonging to the data packet burst.

In some implementations, the first information further includes a number of data packets in the data packet burst, and the second preset duration is a duration for the first device to receive data packets with the number of data packets starting from receiving the second data packet.

In some implementations, the number of data packets is recorded by a counter of the first device, and a starting moment of the counter is the reception moment or the transmission moment of the second data packet.

In some implementations, the first information includes serial number information of the second data packet. In response to a difference between a serial number of the first data packet and a serial number of the second data packet being smaller than a second preset value, the first data packet is regarded as received.

In some implementations, the first information is obtained by at least one of the following: pre-agreeing, determining by the first device, and transmitting by the second device.

In some implementations, the first information is carried by at least one of the following: a packet data convergence protocol (PDCP) header; a RLC header; a media access control (MAC) header; a PDCP control signaling; a RLC control signaling; a media access control control element (MAC CE).

In some implementations, the processing unit 410 is configured to: determine whether to perform a first operation according to second information. The first operation includes determining whether to regard an unreceived data packet as received.

In some implementations, the second information includes instruction information for instructing whether to perform the first operation, or, the second information includes information associated with the first operation.

In some implementations, the first operation is associated with at least one of the following: a logical channel, a logical channel group, a service type, and information of a terminal device.

In some implementations, the information of the terminal device includes at least one of the following: protocol version supported by the terminal device, and device information of the terminal device.

In some implementations, the second information is obtained by at least one of the following: pre-agreeing, determining by the first device, and transmitting by the second device.

In some implementations, the second information is carried by at least one of the following: a radio resource control (RRC) signaling, and a RLC control signaling.

In some implementations, the transceiver unit 420 is configured to: transmit third information to the second device. The third information is configured to indicate whether the first device has a capability to perform the first operation.

In some implementations, the capability is associated with at least one of the following: frequency range, a logical channel, a logical channel group, and information of a terminal device.

In some implementations, in response to regarding the first data packet as received, a status parameter of data packets maintained by the first device is updated based on status of data packets with a second serial number and serial numbers before the second serial number.

In some implementations, in a case that the first data packet is regarded as received, the second serial number is a serial number of the first data packet, or, in a case that a plurality of unreceived data packets are regarded as received, the second serial number is a serial number of a last data packet in the plurality of data packets, and the plurality of data packets includes the first data packet.

In some implementations, the status parameter includes at least one of the following: a first parameter, configured to indicate a next serial number after a serial number of a last completely correctly received data packet, a second parameter, configured to indicate an updated serial number upon timeout of a reassembly timer, a third parameter, configured to indicate a next serial number after a serial number of a received data packet with a maximum received serial number, and a fourth parameter, configured to indicate a serial number of a next incorrectly received data packet after a serial number of a data packet triggering the reassembly timer.

In some implementations, the first parameter is updated to a serial number of a next unreceived data packet after the second serial number, the second parameter is updated to a serial number of a next unreceived data packet after a next received data packet after the first parameter, the serial number indicated by the third parameter is updated to the serial number indicated by the third parameter plus 1 in response to being located before the second serial number, or the serial number indicated by the third parameter remains unchanged in response to being located after the second serial number, and the fourth parameter is updated to a serial number of a next segment of unreceived data packets after the second serial number.

In some implementations, the processing unit 410 is further configured to: in a case that an RLC status report is triggered and the RLC status report indicates that the first data packet is unreceived, cancel the RLC status report and retrigger the RLC status report based on the updated status parameter.

In some implementations, the first data packet includes a service data unit (SDU) and/or a fragment of the SDU.

In some implementations, the first device is a terminal device or a network device.

It can be understood that the processing unit 410 may be, for example, a processor 610, and the transceiver unit 420 may be, for example, a transceiver 630. In addition, optionally, the communication device 400 may further include a memory 620, as specifically shown in FIG. 13.

Figure 12:
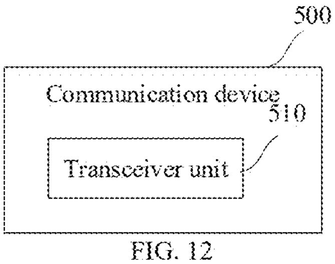
FIG. 12 is a schematic block diagram of a communication device according to an embodiment of the present disclosure.

FIG. 12 is a schematic diagram of a communication device according to another embodiment of the present disclosure. The communication device 500 shown in FIG. 12 may be the above second device and includes a transceiver unit 510. The transceiver unit 510 is configured to transmit first information to the first device. The first information is configured to determine whether an unreceived first data packet is regarded as received, the first information is associated with a second data packet received by the first device, and the first data packet and the second data packet are data packets transmitted in an RLC AM.

In some implementations, the first data packet is regarded as received. The first device does not trigger an RLC status report, or the first device triggers the RLC status report, and the RLC status report does not indicate that the first data packet is unreceived.

In some implementations, the first data packet and the second data packet belong to a same data packet burst.

In some implementations, the second data packet is a first data packet in the data packet burst.

In some implementations, the second data packet is a data packet with a minimum serial number in the data packet burst received by the first device, or a serial number of the second data packet is indicated by a second device.

In some implementations, the first information is configured to determine a second moment. In response to not receiving the first data packet after the second moment, the first data packet is regarded as received.

In some implementations, the first information is configured to determine a second preset duration, and the second moment is at the second preset duration after a reception moment or a transmission moment of the second data packet.

In some implementations, the first information includes time-related information of the data packet burst, and the time-related information of the data packet burst is configured to determine the second preset duration.

In some implementations, the time-related information of the data packet burst includes at least one of the following: an air interface transmission delay budget of the data packet burst, timeout information of the data packet burst, and a clearing moment of the data packet burst.

In some implementations, the timeout information of the data packet burst includes at least one of the following: a timeout moment of the data packet burst, a timeout moment of a first data packet in the data packet burst, a timeout moment of a last data packet in the data packet burst, a timeout moment of an earliest timeout data packet in the data packet burst, and a timeout moment of a latest timeout data packet in the data packet burst.

In some implementations, the second preset duration is recorded by a timer of the first device, and a starting moment of the timer is the reception moment or the transmission moment of the second data packet.

In some implementations, the time-related information of the data packet burst includes at least one of the following: absolute time; system frame number, time slot number, and symbol.

In some implementations, the first information further includes a number of data packets in the data packet burst and/or a data volume of the data packet burst, and the number of data packets in the data packet burst and/or the data volume of the data packet burst are configured to determine data packets belonging to the data packet burst.

In some implementations, the first information includes a number of data packets in the data packet burst, and the second preset duration is a duration for the first device to receive data packets with the number of data packets starting from receiving the second data packet.

In some implementations, the number of data packets is recorded by a counter of the first device, and a starting moment of the counter is the reception moment or the transmission moment of the second data packet.

In some implementations, the first information includes serial number information of the second data packet. In response to a difference between a serial number of the first data packet and a serial number of the second data packet being smaller than a second preset value, the first data packet is regarded as received.

In some implementations, the first information is carried by at least one of the following: a packet data convergence protocol (PDCP) header, a RLC header, a media access control (MAC) header, a PDCP control signaling, a RLC control signaling, and a media access control control element (MAC CE).

In some implementations, the transceiver unit 510 is further configured to: transmit second information to the first device. The second information is configured to determine whether to perform a first operation, and the first operation includes determining whether to regard an unreceived data packet as received.

In some implementations, the second information includes instruction information for instructing whether to perform the first operation, or, the second information includes information associated with the first operation.

In some implementations, the first operation is associated with at least one of the following: a logical channel, a logical channel group, a service type, and information of a terminal device.

In some implementations, the information of the terminal device includes at least one of the following: protocol version supported by the terminal device, and device information of the terminal device.

In some implementations, the second information is carried by at least one of the following: a radio resource control (RRC) signaling, and a RLC control signaling.

In some implementations, the transceiver unit 510 is further configured to: receive third information transmitted by the first device. The third information is configured to indicate whether the first device has a capability to perform the first operation.

In some implementations, the capability is associated with at least one of the following: frequency range, a logical channel, a logical channel group, and information of a terminal device.

In some implementations, in response to regarding the first data packet as received, a status parameter of data packets maintained by the first device is updated based on status of data packets with a second serial number and serial numbers before the second serial number.

In some implementations, in a case that the first data packet is regarded as received, the second serial number is a serial number of the first data packet, or, in a case that a plurality of unreceived data packets are regarded as received, the second serial number is a serial number of a last data packet in the plurality of data packets, and the plurality of data packets includes the first data packet.

In some implementations, the status parameter includes at least one of the following: a first parameter, configured to indicate a next serial number after a serial number of a last completely correctly received data packet, a second parameter, configured to indicate an updated serial number upon timeout of a reassembly timer, a third parameter, configured to indicate a next serial number after a serial number of a received data packet with a maximum received serial number, and a fourth parameter, configured to indicate a next incorrectly received serial number after a serial number of a data packet triggering the reassembly timer.

In some implementations, the first parameter is updated to a serial number of a next unreceived data packet after the second serial number, the second parameter is updated to a serial number of a next unreceived data packet after a next received data packet after the first parameter, the serial number indicated by the third parameter is updated to the serial number indicated by the third parameter plus 1 in response to being located before the second serial number, or the serial number indicated by the third parameter remains unchanged in response to being located after the second serial number, and the fourth parameter is updated to a serial number of a next segment of unreceived data packets after the second serial number.

In some implementations, the transceiver unit 510 is further configured to: receive an RLC status report transmitted by the first device. The RLC status report is an RLC status report triggered by the first device based on the updated status parameter.

In some implementations, the first data packet includes a service data unit (SDU) and/or a fragment of the SDU.

In some implementations, the second device is a terminal device or a network device.

It is understood that the transceiver unit 510 may be, for example, the transceiver 630. In addition, optionally, the communication device 500 may further include a processor 610 and a memory 620, as specifically shown in FIG. 13.

Figure 13:
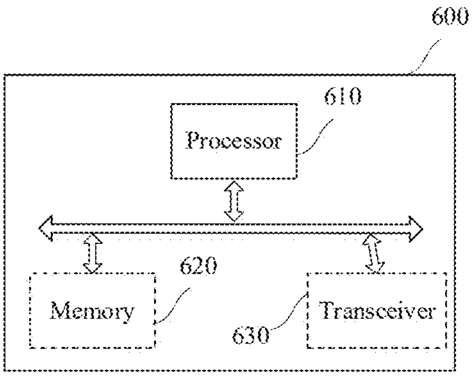
FIG. 13 is a schematic block diagram of a device for communication according to an embodiment of the present disclosure.

FIG. 13 shows a schematic structural diagram of a communication device according to an embodiment of the present disclosure. The dashed lines in FIG. 13 indicate that the units or modules are optional. The device can be used to implement the method described in the above method embodiments. The device can be a chip, a terminal device, or a network device.

As shown in FIG. 13, the device 600 may include at least one processor 610. The at least one processor 610 can support the device 600 to implement the method described in the above embodiments for the method. The at least one processor 610 may be a general-purpose processor or a special-purpose processor. For example, the processor 610 is a central processing unit (CPU). Alternatively, the processor 610 may be other general-purpose processor, a digital signal processor (DSP), an application specific integrated circuits (ASIC), a field programmable gate array (FPGA) or other programmable logic device, a discrete gate or a transistor logic device, a discrete hardware component, etc. The general-purpose processor may be a microprocessor or the processor may be any conventional processor, etc.

The device 600 further includes at least one memory 620 storing a program. The program is executed by the processor 610 to perform the method described in the above embodiments. The memory 620 is independent of or integrated in the processor 610.

The device 600 further includes a transceiver 630. The processor 610 communicates with other devices or chips via the transceiver 630. For example, the processor 610 transmits and receives data with other devices or chips via the transceiver 630.

A communication system is further provided according to an embodiment of the present application, which includes the above first device and the second device. In some implementations, the system further includes other devices that interact with the first device or the second device.

A computer-readable storage medium configured to store a program is provided according to an embodiment of the present disclosure. The computer-readable storage medium is applicable to the communication device according to the embodiments of the present disclosure, such as the first device or the second device, and the program causes the computer to perform the method executed by the first device or the second device according to the embodiments of the present disclosure.

A computer program product is provided according to an embodiment of the present disclosure. The computer program product includes a program. The computer program product is applicable to the communication device according to the embodiments of the present disclosure, such as the first device or the second device, and the program causes the computer to perform the method executed by the first device or the second device according to the embodiments of the present disclosure.

A computer program is further provided according to an embodiment of the present disclosure. The computer program can be applied to the communication device according to the embodiments of the present disclosure, such as the first device or the second device, and the computer program causes a computer to execute the method executed by the first device or the second device according to the embodiments of the present disclosure.

It should be noted that, the terms "system" and "network" in the embodiments of the present disclosure may be used interchangeably. In addition, the terms used in the present disclosure are only used to explain the specific embodiment of the present disclosure, and are not intended to limit the present disclosure. The terms "first", "second", "third", and "fourth" used to are used to distinguish between different objects and are not intended to describe a particular order. In addition, the terms "include" and "have", and any variations thereof, are intended to cover non-exclusive inclusion.

In the embodiments of the present disclosure, the term "indicate" may be a direct indication, an indirect indication, or an association relationship. For example, A indicates B, which can mean that A indicates B directly, for example, B can be obtained through A, or it can mean that A indicates B indirectly, for example, A indicates C, and B can be obtained through C; or it can mean that there is an association between A and B.

In the embodiments of the present disclosure, "B corresponding to A" means that B is associated with A, and B can be determined according to A. However, it should be noted that determining B according to A does not mean determining B only according to A, but also according to A and/or other information.

In the embodiments of the present disclosure, the term "correspond" can indicate a direct or indirect corresponding relationship between the two, or an associative relationship between the two, or a relationship between indicating and being indicated, or configuring and being configured, and the like.

In the embodiments of the present disclosure, "pre-defined" or "pre-configured" can be implemented by pre-saving corresponding codes, tables, or other means that can be used to indicate relevant information in devices (such as terminal devices and network devices), which is not limited by the present disclosure. For example, pre-defined can refer to being defined in a protocol.

In the embodiments of the present disclosure, the term "and/or" is only an association relationship describing the associated objects, which means that there can be three relationships. For example, A and/or B, which can mean that there are three situations: A alone, A and B, and B alone. In addition, the character "/" herein generally indicates an "or" relationship between the associated objects.

In the embodiments of the present disclosure, the term "include" may refer to direct inclusion or indirect inclusion. Optionally, "include" mentioned in the embodiments of the present disclosure may be replaced by "indicate" or "configured to determine". For example, A includes B can be replaced by A indicates B, or A is configured to determine B.

In the embodiments of the present disclosure, the magnitude of the reference numerals of the above processes does not imply the order of execution, and the order of execution of the processes should be determined by its function and inherent logic, and should not constitute any limitation on the implementation process of the embodiments of the present disclosure.

In the embodiments of the present disclosure, it should be understood that the disclosed system, device and method can be realized in other ways. For example, the embodiments for the device described above are only schematic. For example, the division of the units is only a logical function division. In actual implementation, there may be other division methods, such as a plurality of units or components can be combined or integrated into another system, or some features can be ignored or not implemented. In addition, the coupling or direct coupling or communication connection shown or discussed can be indirect coupling or communication connection through some interfaces, devices or units, which can be electrical, mechanical or other forms.

The units described as separate components may or may not be physically separated, and the components displayed as units may or may not be physical units, that is, they may be located in one place or distributed to multiple network units. A portion or all of the units can be selected according to actual needs to achieve the purpose of the embodiments of the present disclosure.

In addition, each respective functional unit in the embodiments of the present disclosure can be integrated into one processing unit, or each respective unit can exist physically, or two or more units can be integrated into one unit.

Through the description of the above embodiments, those skilled in the art can clearly understand that the above method embodiments can be implemented by means of software, hardware, firmware, or any combination thereof. In case of being implemented in software, it can be fully or partially implemented in the form of a computer program product. The computer program product includes one or more computer instructions. When the computer program instructions are loaded and executed on a computer, the flow or function described in the embodiment of the present disclosure is generated in whole or in part. The computer can be a general-purpose computer, a special-purpose computer, a computer network, or other programmable devices. The computer instructions can be stored in a computer-readable storage medium or transmitted from one computer-readable storage medium to another computer-readable storage medium. For example, the computer instructions can be transmitted from a website, a computer, a server or a data center to a website, computer, server or data to another website site, computer, server, or data center through wired (such as coaxial cable, optical fiber, digital subscriber line (DSL)) or wireless (such as infrared, wireless, microwave, etc.). The computer-readable storage medium can be any available medium that a computer can read or a data storage device such as a server, data center, etc. which contains one or more available media integration. The available medium may be a magnetic medium such as a floppy disk, a hard disk, a magnetic tape, etc., or an optical medium such as a digital video disc (DVD) or a semiconductor medium such as a solid state disk (SSD), etc.

The above is only the specific embodiments of the present disclosure, but the protection scope of the present disclosure is not limited thereto. Any variations or substitutions that can be easily conceived by those skilled in the art within the technical scope disclosed by the present disclosure, should be included in the protection scope of the present disclosure. Therefore, the protection scope of the present disclosure should be based on the protection scope of the claims.

What is claimed is:

1. A communication method, comprising:

in response to meeting a first condition, regarding, by a terminal device comprising at least one processor, an unreceived first data packet as received, wherein the first condition is determined based on a second data packet received by the terminal device, and the first data packet and the second data packet are data packets transmitted in a radio link control (RLC) acknowledged mode; and in response to the regarding the unreceived first data packet as received, updating a status parameter maintained by the terminal device, wherein the status parameter includes at least one of the following:

a first parameter that indicates a next serial number after a serial number of a last completely correctly received data packet, wherein the first parameter is updated to a serial number of a next unreceived data packet after a second serial number; or a fourth parameter that indicates a serial number of a next incorrectly received data packet after a serial number of a data packet triggering a reassembly timer, wherein the fourth parameter is updated to a serial number of a next unreceived data packet after the second serial number.

2. The communication method according to claim 1, further comprising:

in response to the regarding the unreceived first data packet as received, the first device triggering an RLC status report, wherein the RLC status report indicates that the first data packet is received.

3. The communication method according to claim 1, wherein the first condition is determined based on first information, and the first information includes at least one of time-related information.

4. The communication method according to claim 3, wherein the first data packet and the second data packet are located in a same reception window, and wherein the second data packet includes at least one of the following:

a data packet with a maximum serial number among received data packets in the reception window;

a latest received data packet among received data packets in the reception window;

a data packet with a minimum serial number among received data packets in the reception window; or an earliest received data packet among received data packets in the reception window.

5. The communication method according to claim 3, wherein the first information includes time-related information of the second data packet, and the time-related information of the second data packet is configured to determine a second moment, wherein the first data packet is regarded as received in response to not receiving the first data packet after the second moment.

6. The communication method according to claim 5, wherein the time-related information of the second data packet includes a reception moment of the second data packet, wherein the second moment is at a second preset duration after the reception moment of the second data packet.

7. The communication method according to claim 6, wherein the second preset duration is recorded by a timer of the terminal device, and a starting moment of the timer is the reception moment of the second data packet.

8. The communication method according to claim 3, wherein the first information is obtained by at least one of the following: pre-defined or determining by the terminal device.

9. The communication method according to claim 1, wherein in a case that the first data packet is regarded as received, the second serial number is a serial number of the first data packet; or, in a case that a plurality of unreceived data packets are regarded as received, the second serial number is a serial number of a last data packet in the plurality of data packets, and the plurality of data packets includes the first data packet.

10. The communication method according to claim 1, further comprising:

in a case that an RLC status report is triggered and the RLC status report indicates that the first data packet is unreceived, canceling the RLC status report and retriggering the RLC status report based on the updated status parameter.

11. An apparatus, comprising:

at least one processor; and one or more non-transitory computer-readable storage media coupled to the at least one processor and storing programming instructions for execution by the at least one processor, wherein the programming instructions, when executed, cause the apparatus to perform operations comprising:

in response to meeting a first condition, regarding an unreceived first data packet as received, wherein the first condition is determined based on a second data packet received by the apparatus, and the first data packet and the second data packet are data packets transmitted in a radio link control (RLC) acknowledged mode; and in response to the regarding the unreceived first data packet as received, updating a status parameter maintained by the apparatus, wherein the status parameter includes at least one of the following:

a first parameter that indicates a next serial number after a serial number of a last completely correctly received data packet, wherein the first parameter is updated to a serial number of a next unreceived data packet after a second serial number; or a fourth parameter that indicates a serial number of a next incorrectly received data packet after a serial number of a data packet triggering a reassembly timer, wherein the fourth parameter is updated to a serial number of a next unreceived data packet after the second serial number.

12. The apparatus according to claim 11, wherein the operations comprise in response to the regarding the unreceived first data packet as received, triggering an RLC status report, wherein the RLC status report indicates that the first data packet is received.

13. The apparatus according to claim 11, wherein the first condition is determined based on first information, and the first information includes at least one of time-related information.

14. The apparatus according to claim 13, wherein the first data packet and the second data packet are located in a same reception window, and wherein the second data packet includes at least one of the following:

a data packet with a maximum serial number among received data packets in the reception window;

a latest received data packet among received data packets in the reception window;

a data packet with a minimum serial number among received data packets in the reception window; or an earliest received data packet among received data packets in the reception window.

15. The apparatus according to claim 13, wherein the first information includes time-related information of the second data packet, and the time-related information of the second data packet is configured to determine a second moment, wherein the first data packet is regarded as received in response to not receiving the first data packet after the second moment.

16. The apparatus according to claim 15, wherein the time-related information of the second data packet includes a reception moment of the second data packet, wherein the second moment is at a second preset duration after the reception moment of the second data packet.

17. The apparatus according to claim 16, wherein the second preset duration is recorded by a timer, and a starting moment of the timer is the reception moment of the second data packet.

18. The apparatus according to claim 13, wherein the first information is obtained by at least one of the following: pre-defined or determining by the apparatus.

19. The apparatus according to claim 11, wherein the operations comprise:

in a case that an RLC status report is triggered and the RLC status report indicates that the first data packet is unreceived, canceling the RLC status report and retriggering the RLC status report based on the updated status parameter.

20. One or more non-transitory computer-readable media storing computer instructions, that when executed by one or more processors, cause a computer to perform operations comprising:

in response to meeting a first condition, regarding an unreceived first data packet as received, wherein the first condition is determined based on a second data packet, and the first data packet and the second data packet are data packets transmitted in a radio link control (RLC) acknowledged mode; and in response to the regarding the unreceived first data packet as received, updating a status parameter, wherein the status parameter includes at least one of the following:

a first parameter that indicates a next serial number after a serial number of a last completely correctly received data packet, wherein the first parameter is updated to a serial number of a next unreceived data packet after a second serial number; or a fourth parameter that indicates a serial number of a next incorrectly received data packet after a serial number of a data packet triggering a reassembly timer, wherein the fourth parameter is updated to a serial number of a next unreceived data packet after the second serial number.

* * * * *